United States Patent Office 3,432,539
Patented Mar. 11, 1969

3,432,539
ICOSAHEDRAL DODECAHYDRODODECA-
BORANE DERIVATIVES AND THEIR
PREPARATION
William C. Drinkard, Jr., Wilmington, Del., assignor to
E. I. du Pont de Nemours and Company, Wilmington,
Del., a corporation of Delaware
No Drawing. Continuation-in-part of application Ser. No.
220,910, Aug. 31, 1962. This application June 30, 1965,
Ser. No. 468,580
U.S. Cl. 260—462          14 Claims
Int. Cl. C07f 5/02; C08g 33/18

ABSTRACT OF THE DISCLOSURE

A process for preparing derivatives of icosahedral dodecaborane which comprises reacting an acid hydrate of icosahedral dodecaborane ($H_2B_{12}H_{12} \cdot nH_2O$) with an epoxide having a structural formula,

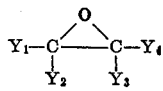

wherein $Y_1$, $Y_2$, $Y_3$ and $Y_4$ are hydrogen or monovalent radicals. Useful epoxides are those which will react with benzene in the presence of an aluminum chloride catalyst at temperatures of less than 100° C. to form a substituted benzene. Of the icosahedral dodecahydrododecaborane derivatives of this process, some have detergent properties, some are used as pigments or dyes and others for the formation of films, fibers, and coatings.

---

This is a continuation-in-part of application Ser. No. 220,910, filed Aug. 31, 1962, now abandoned.

This invention relates to a process for perparing derivatives of icosahedral dodecahydrododecaborane and to compounds containing an icosahedral dodecahydrate dodecaborane structural unit.

Molecules containing ten boron atoms (decaborane) can be made with two structural arrangements: the recently discovered hexadecahedral (16 sides), decaborane anion $(B_{10}H_{10})^{-2}$ and the well known cup-shaped decaborane $B_{10}H_{14}$. A description of the cup-shaped decaborane is found in Gould, Inorganic Reactions and Structures, p. 130 (Revised edition 1962), Holt, Reinhart and Winston, Inc. The structural arrangement of the hexadecahedral decaborane anion is analogous to two square-based pyramids having their bases spaced apart and facing each other with one base rotated 45° relative to the other; each corner of each base is a boron atom and each boron atom is connected by a bond to two adjacent boron atoms of its base, the boron atom at the apex of its pyramid and the two closest boron atoms of the facing base. A hydrogen atoms is attached externally to each boron in this symmetrical arrangement and the total structure carries an electric charge equivalent to two electrons. The structural arrangement of the icosahedral dodecaborane anion $(B_{12}H_{12})^{-2}$ is similar to that of the hexadecahedral decaborane anion described above execpt that the square-based pyramids of the latter are replaced with pentagonal based pyramids and the bases rotated 36° instead of 45°. The boron atoms in the bases are joined in similar fashion to adjacent boron atoms to produce a structural unit with 20 sides.

Each of hexadecahedral decaborane and icosahedral dodecaborane is substantially differnt from the well known cup shaped decaborane both in physical and chemical properties. The cup shaped decaborane, of course, contains four extra hydrogens; it decomposes in water to form weak boric acid (pH about 5) and its derivatives are usually active reducing agents for metallic ions. It does not itself form ions and is generally unstable. In contrast the icosahedral dodecaborane anion is stable in the presence of acid and in combination with hydrogen ions forms a strong acid hydrate having the formula $H_2B_{12}H_{12} \cdot nH_2O$ (pH about 2) and its derivatives are not reducing agents by virtue of the dodecaborane structure but form salts with metallic and other cations, form strongly charged substituted ions in aqueous solutions, some of which have detergency and coloring properties, and are generally stable.

Derivatives of cup shaped decaboranes have been prepared by reaction of monooxacycloalkanes in solutions of monooxacycloalkane. This reaction occurs at a very slow rate requiring as long as four weeks for oxolanes and 20 hours for oxetanes at room temperature.

In the present invention a process for preparing derivatives of icosahedral dodecaborane is provided which is rapid and economical. This process comprises reacting an acid hydrate of icosahedral dodecaborane ($H_2B_{12}H_{12} \cdot nH_2O$) with an epoxide having the structural formula

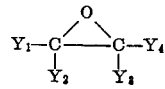

It is thought that in this reaction one of the C—O bonds of the epoxide is ruptured and the oxygen atom associated therewith attaches to a boron atom of dodecaborane. In the epoxide each of $Y_1$, $Y_2$, $Y_3$ and $Y_4$ is hydrogen or a monovalent radical. Any epoxide which will react with benzene in the presence of aluminum chloride catalyst at a temperature of less than about 100° C. to form a substituted benzene of the type having the structural formula

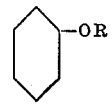

where OR corresponds to the epoxide utilized with the epoxy ring opened, is useful in this invention.

By conducting the reaction in a solution of

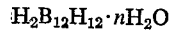

$H_2B_{12}H_{12} \cdot nH_2O$ and regulating the temperature to provide a controlled reaction rate, high yields of substituted hydrododecaborate anions are produced. These substituted anions have the formula $[B_{12}H_{10}(OR)_2]^{-2}$ where —OR corresponds to the epoxide utilized with the epoxy ring opened to form a monovalent —OR radical which is bonded to the boron in the cage structure through oxygen. The product is conveniently recovered by precipitation as an insoluble salt, for example, the cesium salt

$[Cs_2B_{12}H_{10}(OR)_2]$

By varying the relative quantity of epoxide employed, other similar anions containing ether-like functions can be obtained having the general formula

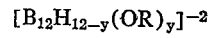

$[B_{12}H_{12-y}(OR)_y]^{-2}$ where $y$ is a whole number from 1 to 4 or more.

The substituted icosahedral dodecaborane compounds produced according to this invention can have electrical charges arising from the nature of the R groups in the formula in addition to the charge associated with the boron cage itself. For example, R may bear carboxyl groups which, in ionic form, require the presence of a cation. As a further illustration, R may bear basic groups, e.g., NH₂, which will form ionizable salts with acids. Cations and anions derived from R groups are considered to be part of these groups and are included within the scope of the definition of R.

In carrying out the process $H_2B_{12}H_{12} \cdot nH_2O$ is conveniently used in the form of an aqueous syrup in which water and $H_2B_{12}H_{12} \cdot nH_2O$ are present in about equal amounts by weight. However, no water is necessary for the present process beyond that which is necessary to permit the dodecahydrododecaborate (−2) anion to be in its acidic form.

In a preferred procedure the $H_2B_{12}H_{12} \cdot nH_2O$ aqueous syrup mentioned is mixed with a solvent such a glyme (ethyleneglycoldimethylether) to form a solution, and an epoxide in fluid form (i.e., this may be a liquid epoxide, or a solid epoxide in solution) is added slowly (usually dropwise) while maintaining the temperature of the reaction mixture in the range of about 10° C. to about 30° C. The reaction is practically instantaneous and is controlled by the rate of addition of the epoxide and by regulating the solution temperature. With very highly reactive epoxides, temperatures of 0° C. and even lower may be necessary for reaction rate control whereas temperatures above 30° C. may be used to increase the reaction rate of relatively sluggish epoxides. Untried epoxides may be handled by starting the reaction at a low temperature and gradually warming the reaction mixture until the desired reaction rate is achieved. The reaction product is readily recovered by precipitation as an insoluble salt, but any convenient recovery procedure such as extraction, distillation and the like can be used. Cesium in the form of CsF and CsOH is preferred as the precipitating agent.

Both liquid and solid epoxides can be utilized in this invention. Solid epoxides are conveniently dissolved in a solvent miscible with the $H_2B_{12}H_{12} \cdot nH_2O$ solution to be used in order to facilitate contact between the reactants. Usually both reactants can be dissolved in glyme which is accordingly a preferred solvent for practicing this invention. Preferably the solvent used is one in which $H_2B_{12}H_{12} \cdot nH_2O$ dissolves readily. Most desirable the solvent should also permit recovery of the product by a convenient method. Other useful solvents include alcohols such as methanol, ethanol and cyclohexanol; esters such as methyl acrylate and butyl propionate; dioxane; nitriles such as acetonitrile and benzonitrile.

The process of this invention may be practiced with epoxides generally. When there are two or more oxirane groups in the epoxide, these may be vicinal or may be separated by one or more intervening atoms and may be mono- or poly-functional, cyclic or acyclic. Polymeric products are obtainable by using appropriate epoxides, that is, epoxides with polymer forming functional groups or epoxides which are already polymers containing one or more epoxy groups. Epoxides containing ethylenic unsaturation sometimes react with $H_2B_{12}H_{12} \cdot nH_2O$ to produce compounds in which —OR, the epoxide compound moiety, is saturated. Otherwise the organic portion of the reaction product usually corresponds to the epoxide reagent used, the epoxy group simply opening up and attaching to boron in the boron hydride cage by an ether like linkage.

The epoxides useful in this invention have the generic formula

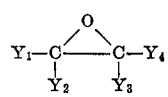

(1)

where $Y_1$, $Y_2$, $Y_3$ and $Y_4$ can be the same or different and can each be hydrogen or a monovalent organic radical.

Preferably the epoxide contains less than about 20 carbon atoms since these are most conveniently available. Any or all of $Y_1$, $Y_2$, $Y_3$ and $Y_4$ may be the same or different from each other and may be hydrogen or a hydrocarbon group such as an aromatic, aliphatic or alicyclic group or a heterocyclic group or may be a functional group such as one of the functional groups listed below or one of the above-mentioned groups substituted with one or more of the following functional groups:

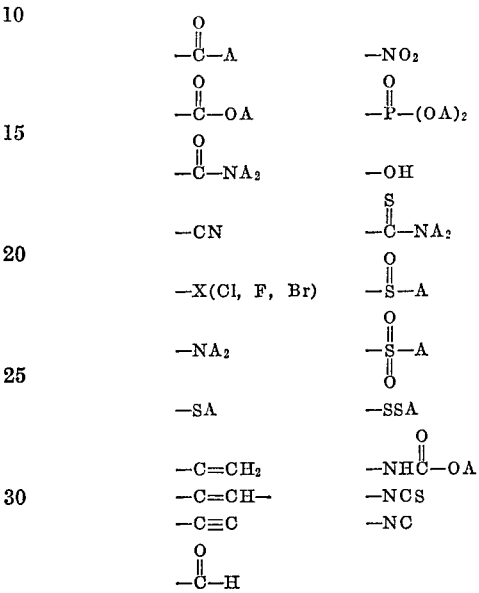

In the above groups A is a monovalent organic radical preferably hydrocarbon, of at most about 15 carbons, which can be alkyl, alkenyl, cycloalkyl, cycloalkenyl, aryl, alkaryl, aralkyl and the like. Any of $Y_1$, $Y_2$, $Y_3$ and $Y_4$ may contain one or more epoxy groups and any two or more of $Y_1$, $Y_2$, $Y_3$ and $Y_4$ can in combination represent an aromatic, alicyclic or heterocyclic group.

Epoxides preferred for use in this invention are those containing not more than twenty carbon atoms and having the structural formula

(2)

in which $Y_1$ and $Y_4$ have the meaning set forth above and in which $Y_1$ and $Y_4$ are functional groups such as those listed above or radicals containing such functional groups. Such epoxides in which the functional groups are polymer forming are particularly preferred. The polymer forming groups may be capable of forming addition polymers or condensation polymers. Following reaction of the particular epoxide with $H_2B_{12}H_{12} \cdot nH_2O$ the polymer may be produced by a conventional reaction.

Polymers containing the hydrododecaborate unit may also be prepared by the process of the present invention by employing a polymer containing an epoxy group, that is, an epoxide of the above structural Formula 1 in which one or more of $Y_1$, $Y_2$, $Y_3$ or $Y_4$ is a polymer radical, that is, a radical formed by removing hydrogen from a polymer. The polymer may be an addition or a condensation polymer and is preferably a linear polymer. Polyamides, polyesters and polyureas are preferred condensation polymers, being very useful for the formation of fibers and films, coatings, finishes and insulation in applications where the presence of the hydrododecaborate anion is desirable.

The polymers of this invention contain the group —$B_{12}H_{10}$—O—, usually as a component of each recurring unit. This group can be in the backbone of the polymer chain or in a pendant group. Thus typical addition polymers have the recurring unit

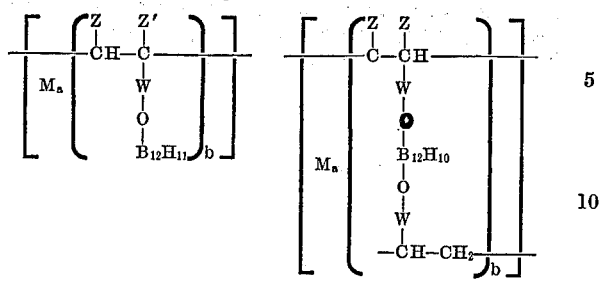

where W is a divalent organic radical containing an alkylene group attached to the oxygen in the formula, M, $a$ and $b$ are as defined below and Z and/or Z' can be hydrogen or a monovalent organic radical such as —CN, —COOH, —OH, halogen or hydrocarbon. Preferably W, Z and Z' each contain less than about 20 carbon atoms. Typical polymers in which the $B_{12}H_{10}O$— group is a part of the polymer background have the following recurring unit

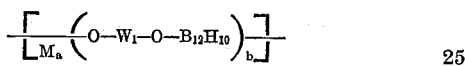

where M, $a$ and $b$ are as defined below and $W_1$ is a divalent organic radical having ethylene groups (substituted or not) attached to the oxygens. For linear polymers the group —O—$W_1$—O— is a divalent organic radical obtained by reacting an epoxide of Formula 1 containing two epoxide groups (as when one of $Y_1$, $Y_2$, $Y_3$ or $Y_4$ contains an epoxide group) with $H_2B_{12}H_{12} \cdot nH_2O$ according to this invention to open both of the epoxide groups. When the epoxide used contains more than two epoxide groups cross linking will usually result if more than two of the epoxide groups are reactive under the conditions used. Stated somewhat differently, $W_1$ is a divalent organic radical having the formula

where $t_1$, $t_2$, $t_3$ and $t_4$ are the same or different and can be hydrogen or a monovalent organic radical sufficiently unreactive toward epoxide groups to be capable of existence in the compound

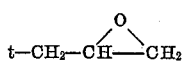

where $t$ represents each of $t_1$, $t_2$, $t_3$ and $t_4$ and W' is any divalent organic radical. Preferably $W_1$ and W' contain less than about 20 carbon atoms. Polymers of this type can be prepared by reacting $H_2B_{12}H_{12} \cdot nH_2O$ with a diepoxide in accordance with the present invention.

All of the polymers referred to may have molecular weights comparable to those of conventional and well known polymers. Persons skilled in polymer chemistry are well aware of the reaction conditions which govern polymer formation and size and will have no difficulty in producing in accordance with this invention polymers suitable for particular applications and requiring specific properties in addition to those unique properties contributed by boron.

Other epoxides useful in this invention include the following:

Glycidol

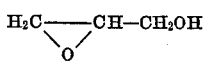

Vinyl cyclohexene diepoxide

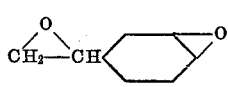

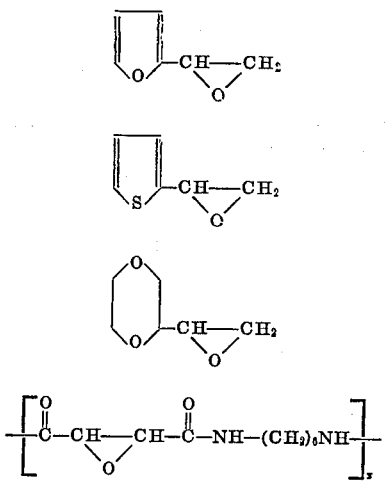

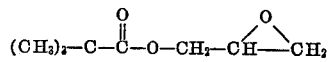

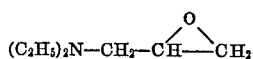

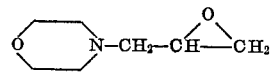

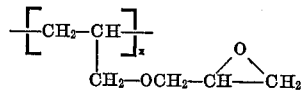

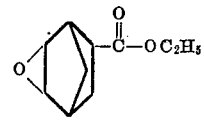

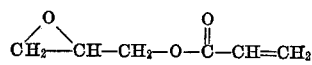

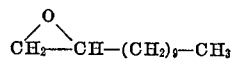

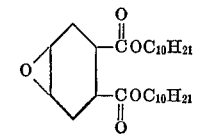

Di-3,4-epoxy-6-methylcyclohexyl-methyladipate

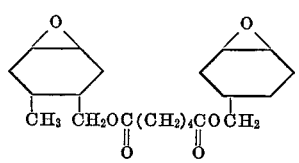

3,4 - epoxy - 6 - methylcyclohexyl - methyl - 3,4 - epoxy-6-methylcyclohexane carboxylate

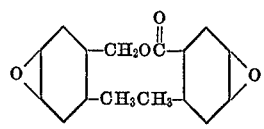

3,4-epoxycyclohexane carbonitrile

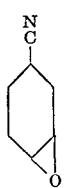

Dipentene dioxide (limonene dioxide)

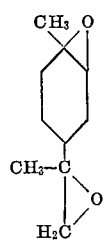

1,2-epoxy-3-phenoxy propane

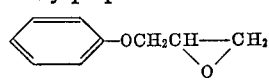

Dipentene monoxide

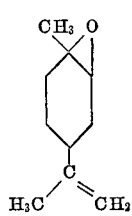

Alpha-pinene oxide

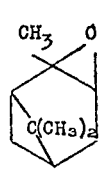

1,2-epoxy-3-allyloxy propane

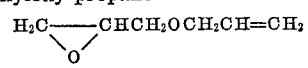

1,2-epoxy-3-(2-allylphenoxy) propane

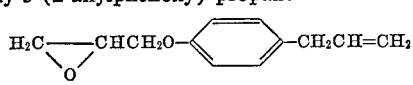

1,2-epoxy-3-butoxy propane

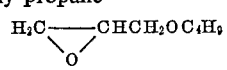

1,2-epoxy-3-(2-chloroethoxy) propane

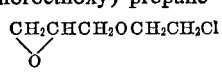

1,2-epoxy-3-(2-chlorophenoxy) propane

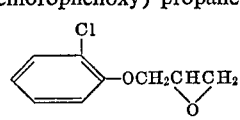

1,2-epoxy-3-(4-chlorophenoxy) propane

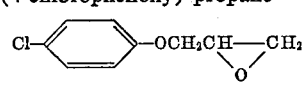

1,2-epoxy-3-(2,4-dichlorophenoxy) propane

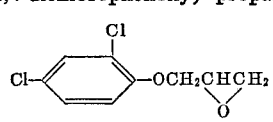

1,2-epoxy-3-ethoxypropane

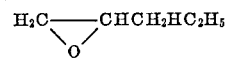

1,2-epoxy-3-hexoxypropane

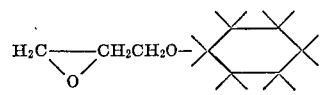

1,2-epoxy-3-(3-methyl butoxy) propane

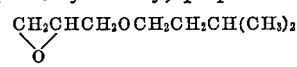

1,2-epoxy-3-(3-methylphenoxy) propane

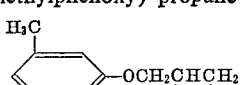

1,2-epoxy-3-(2-methyl phenoxy) propane

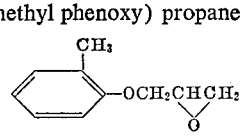

1,2-epoxy-3-methoxy propane

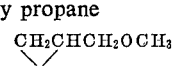

1,2-epoxy-3-pentoxy propane

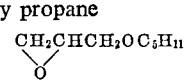

1,2-epoxy-3-propoxy propane

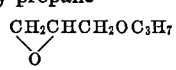

Phenyl methyl glycidic ester

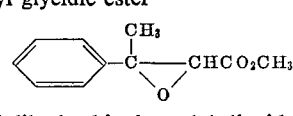

3,4-epoxy-2,5-dihydrothiophene-1,1-dioxide

1,2-diphenyl ethylene oxide

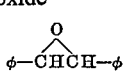

3,4-epoxy-4-methyl-2-pentanone

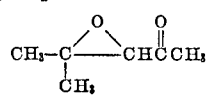

3-phenyl-2,3-epoxy butyronitrile

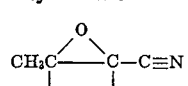

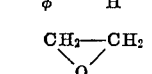

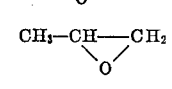

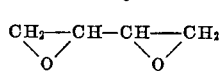

In the above structural formulas $x$ is a whole number, usually a large whole number, signifying the number of recurring structural groups in the formula of a polymer and $\phi$ represents a phenyl group.

Salts of the derivatives of icosahedral dodecaborane produced according to this invention can be obtained by adding compounds capable of forming cations to the reaction product mixture or in a solvent miscible with and also added to the mixture. These salts have the structural formula

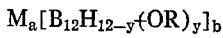

$$M_a[B_{12}H_{12-y}(OR)_y]_b$$

where M is a cation (i.e., an atom or group of atoms which forms a positively charged ion in aqueous solution); —OR is a monovalent organic substituent connected to boron in the boron cage by an ether-like linkage and corresponds to the epoxide used in the reaction in its saturated form and with the epoxy ring opened; $y$ is a whole number preferably from 1 to 4 but may be higher and $a$ and $b$ are positive whole numbers of 1–3 inclusive, whose values are determined by the valence of M such that $b=a/2$ (valence of M). The —OR groups, when more than one is present, can be the same or different. Where R is a polymeric radical the above formula would represent a recurring unit in the polymer.

The boron-containing group $[B_{12}H_{12-y}(OR)_y]^{-2}$ in the above formula forms an anion in aqueous solution and behaves as a stable chemical entity in conventional reactions. By varying the amount of epoxide used in the process of preparation, $y$ may be varied from 1 to 4 or more to produce $(B_{12}H_{11}OR)^{-2}$, $[B_{12}H_{10}(OR)_2]^{-2}$, $[B_{12}H_9(OR)_3]^{-2}$, $[B_{12}H_8(OR)_4]^{-2}$ and higher substituted boron cage anions of this type. Since these anions exhibit detergent properties in aqueous solution the compounds containing more than two (OR) groups are difficult to recover. Anions of the general formula are conveniently recovered as their insoluble salts such as the cesium salt $Cs_2B_{12}H_{12-y}(OR)_y$.

M can be any cation which forms a salt with the $[B_{12}H_{12-y}(OR)_y]^{-2}$ in the reaction product mixture. Where recovery of the boron derivative is not desired, as when it is going to be used in solution, M can be any cation which produces a salt of the desired solubility with the anion produced. Exemplary cations include the following: hydrogen, hydronium ($H_3O^+$), a metal, ammonium ($NH_4^+$), hydrazonium ($NH_2$—$NH_3^+$), N-substituted ammonium, N-substituted hydrazonium, aryldiazonium, pyridinium, quinolinium, sulfonium, phosphonium, metal amine and the like.

More specifically, M can be lithium, sodium, cesium, beryllium, barium, lanthanum, zirconium, vanadium, manganese, iron, cobalt, copper, zinc, mercury, aluminum, thallium, tin, lead, antimony, bismuth, silver or any other metal.

As further more specific examples, M can be $ANH_3^+$, $A_2NH_2^+$, $A_3NH^+$, $A_4N^+$, $(ANHNH_3)^+$, $(A_2N—NH_3)^+$, $A_3S^+$ or $A_4P^+$, where A is an organic radical bonded to the nitrogen, sulfur or phosphorus. The A groups are not critical features of these cation groups. The substituents represented by A can be open-chain or closed-chain, saturated or unsaturated, or the groups can be composed of heterocyclic rings of which the nitrogen, sulfur or phosphorus is a component, e.g., pyridine, quinoline, morpholine, hexamethyleneimine and the like. Preferably A, for reasons of availability of reactants, represents a hydrocarbon group of at most 18 carbons.

The group M can be a Werner-type coordination complex. e.g., a metal ammine such as $[Ni(NH_3)_6]^{+2}$, $[Zn(NH_3)_4]^{+2}$, $[Co(NH_2C_2H_4NH_2)_3]^{+2}$, $[Co(NH_3)_6]^{+3}$ and the like.

The products of this invention may be used in situ or may be recovered and purified by any convenient means. Crystallization from aqueous ethanol solutions is usually effective. For products of limited stability, solutions of the products can be treated with adsorptive agents, e.g., activated charcoal or silica gel to adsorb the major portion of the impurities.

To obtain compounds having two or more —OR groups which are unlike, the dodecahydrododecaborate acid hydrate is reacted with one epoxide until the desired number of substituents are introduced and the partially substituted product is then reacted with a second epoxide. The intermediate partially substituted product can, if desired, be isolated prior to reaction with the second electrophilic reagent. The process can be repeated with a third epoxide or even further. Further modification of various substituent groups can be accomplished by conventional methods to obtain compounds having a broad range of OR groups.

Salts produced by the process of this invention are usually solids, many of which dissolve in water. They vary in stability and certain nitro and nitroso containing compounds are sensitive to shock and should be kept moist while handling. Others, including the halogen-substituted products and hydrocarbon-substituted products, are stable and can be stored for long periods without extraordinary care.

The process of this invention provides a unique method for introducing a boron cage structure with its attendant properties into polymers. As pointed out above, this is accomplished by utilizing epoxides having polymer forming functional groups or other groups convertible into such polymer forming groups. Polymers containing one or more epoxide groups may also be used. The process is also useful for introducing the hydrododecaborate anion into a wide variety of other compounds for applications where a high boron content is desirable. Many of the compounds have detergent properties and some are colored permitting their use as pigments or dyes. The dodecaborate cage of the products of this invention possesses an aromatic character and undergoes reactions in a manner resembling benzene, that is, it will react with reagents to add substituents which are capable of bonding to a carbon of an aromatic nucleus such as benzene, naphthalene, toluene, etc. Thus, compounds or anions produced by this invention and in which the dodecaborane cage hydrogen atoms are not completely replaced by OR groups, may be reacted with the numerous reagents suitable for reaction with an aromatic compound to produce an endless variety of compounds suitable for predetermined end uses.

The process of this invention and products produced thereby are illustrated in the following examples. Preparation of $Na_2B_{12}H_{12} \cdot 2H_2O$ from diborane is also shown.

EXAMPLE 1

(A) Preparation of $M_2B_{12}H_{12} \cdot 2H_2O$ (where M is $Na^+$)

A pressure vessel of 400 ml. capacity is charged with 9.5 g. of sodium hydroborate and 75 ml. of 1,2-dimethoxyethane, also called "glyme." The vessel is closed, cooled to —80° C. and evacuated to a pressure of about 0.001 mm. of mercury. Diborane (14.0 g.) is charged into the vessel which is then sealed and heated with agitation under autogenous pressure for 10 hours at 120° C. The molar ratio of $NaBH_4$ to $B_2H_6$ in this reaction is 1:2. The reactor is cooled, the volatile products are released by venting and the contents of the tube are washed into a receiver with glyme. A suspension of a white solid in a yellow liquid is formed from which the solid is separated by filtration. The solid is dissolved in hot tetrahydrofuran and the solution is filtered to remove a trace of unreacted sodium hydroborate. The hot filtrate is diluted with glyme and chilled to yield 14.0 g. of disodium polyhydropolyborate($2^-$) as long, glistening white needles. The compound crystallizes with 1,2-dimethoxyethane and water. The compound has the following infrared absorption frequencies: 2.8$\mu$, sharp, medium; 3.9$\mu$ with 4.02$\mu$ shoulder, sharp, strong; 6.2, 7.8 and 8.4$\mu$, sharp, medium; 9.3$\mu$, medium, sharp, strong; 10.9$\mu$, sharp, strong; and 13.9$\mu$, broad, weak. The compound shows the absorption bands which are characteristic of the dodecahydrodecaborate anion. It has the following elemental analysis: Analysis found: C, 14.33; H, 7.09; B, 45.08; Na, 16.1.

The compound therefore is a solvate of disodium dodecahydrododecaborate having the following composition: $Na_2B_{12}H_{12} \cdot 0.86C_4H_{10}O_2 \cdot 1.25H_2O$.

The compound can be obtained as its hydrate, free of ether of solvation, by recrystallization from a large quantity of diethyl ether or tetrahydrofuran/diethyl ether mixtures, followed by drying under reduced pressure. The ether-free hydrate has infrared absorption characteristics as follows: $2.8\mu$, sharp, medium; $3.9\mu$, sharp, strong; $6.2\mu$, sharp, medium; $9.25\mu$, sharp, medium; and $13.9\mu$ broad, medium. The elemental analysis is as follows: Found: H, 6.56; B, 62.02; Na, 20.5.

The compound is therefore a monohydrate of disodium dodecahydrododecaborate, i.e., $Na_2B_{12}H_{12} \cdot H_2O$ (calculated analysis: H, 6.85; B, 63.05; Na, 22.32).

The dihydrate, $Na_2B_{12}H_{12} \cdot 2H_2O$, is obtained in the above process by less intensive drying of the crystals.

(B) Preparation of $H_2B_{12}H_{12} \cdot nH_2O$

A solution of 2.9 g. of $Na_2B_{12}H_{12} \cdot 2H_2O$, obtained in Part A, in 30 ml. of water is passed through a 0.5 inch diameter chromatography column containing 80 ml. of a commercial acidic ion exchange resin ("Amberlite IR 120–H"). The water effluent is clear, colorless and acidic. The column is rinsed with more water until the effluent is no longer acidic and the water fractions are combined. Evaporation of the combined aqueous solutions under reduced pressure (1 mm. of mercury) at a temperature of about 40° C. leaves a white solid residue which has the formula $H_2B_{12}H_{12} \cdot nH_2O$.

EXAMPLE 2

A solution of 2.9 g. (0.013 mole) of $Na_2B_{12}H_{12} \cdot 2H_2O$ in 10 ml. of water is passed through an "Amberlite IR 120–H" ion exchange column to produce the acid $H_2B_{12}H_{12} \cdot nH_2O$. Water is evaporated in vacuum at $<25°$ C. and the solid residue dissolved in 20 ml. of glyme. A solution of 2.4 g. (0.026 mole) of epichlorohydrin in 10 ml. of glyme is added dropwise. The reaction is cooled in an ice bath. The solvent is evaporated in vacuum and the residue dissolved in ethanol. Addition of 3.9 g. (0.026 mole) of CsF dissolved in 10 ml. of glyme results in the formation of a white precipitate.

Analysis shows that one molecule of solvent has also reacted to give $CsB_{12}H_{10}(OCH_2CH_2CH_2Cl)(OCH_2CH_2OCH_3)$ Calc'd: C, 12.5; H, 4.0; B, 22.7; Cl, 6.2. Found: C, 11.27; H, 3.86; B, 20.67; Cl, 6.67.

EXAMPLE 3

To a solution of $H_2B_{12}H_{12} \cdot nH_2O$ in glyme, prepared as in Example 2, is added dropwise 2.7 g. (0.026 mole) of styrene oxide while cooling in an ice bath. Temperature is maintained at 35–40° C. The solvent is evaporated in vacuum to give a yellow gum. This residue is dissolved in 20 ml. of ethanol and 3.9 g. (0.026 mole) of CsF dissolved in ethanol is added. A white precipitate results. The precipitate is purified by washing with ethanol and ethyl ether. Elemental and infrared analyses show the compound to be

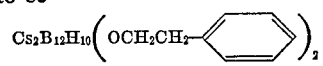

Calc'd: C, 29.6; H, 4.5; B, 20.0. Found: C, 27.22; H, 4.70; B, 18.49.

EXAMPLE 4

A solution of 2.0 g. (0.013 mole) of dicyclopentadiene dioxide dissolved in 10 ml. of gylme is added dropwise to a 20 ml. solution of $H_2B_{12}H_{12} \cdot nH_2O$ in glyme prepared as in Example 2. The solution is maintained at 40° C. by cooling with an ice bath. The solution is allowed to cool to room temperature and the solvent is evaporated at reduced pressure. The residual tar is dissolved in ethanol and a solution of 3.9 g. (0.026 mole) of CsF added. A light tan precipitate forms and is isolated. Elemental and infrared analyses show the product is

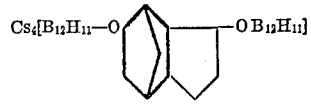

Calc'd: C, 12.3; H, 3.67; B, 21.6. Found: C, 13.02; H, 4.54; B, 24.62.

EXAMPLE 5

This example illustrates the following reaction:

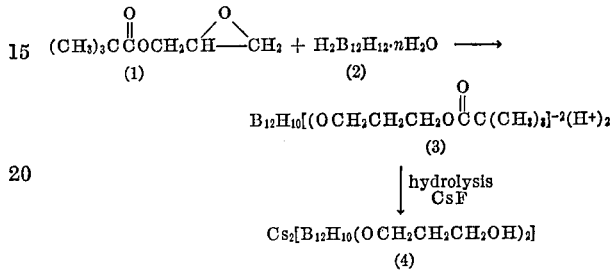

The procedure of Example 2 is followed and the ultimate product anion (4) is recovered by precipitation and identified by elemental and infrared analyses as the cesium salt $Cs_2B_{12}H_{10}(OCH_2CH_2CH_2OH)_2$.

Calc'd: C, 7.5; H, 3.7; B, 27.0. Found: C, 9.05; H, 3.79; B, 22.87.

EXAMPLE 6

The following reaction is carried out:

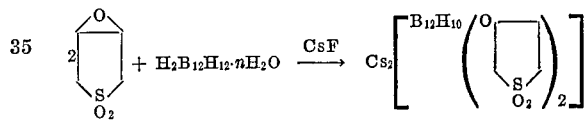

A solution of 22.4 g. (0.10 mole of $Na_2B_{12}H_{12} \cdot 2H_2O$ in 40 ml. of water is passed through an "Amberlite IR 120–H" ion exchange column to produce the acid $H_2B_{12}H_{12} \cdot nH_2O$. Water is evaporated from the $H_2B_{12}H_{12} \cdot nH_2O$ in vacuum at 20° C. to give a white solid residue. The acid residue is dissolved in 60 ml. of glyme and 26.8 g. (0.20 mole) of 3,4-epoxy-2,5-dihydrothiophene-1,1-dioxide added dropwise. Glyme is evaporated in vacuum and the residue dissolve in 60 ml. of ethanol. A solution of 30.4 g. (0.20 mole) of cesium fluoride in 60 ml. of ethanol is added to precipitate

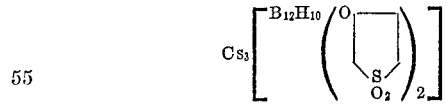

Product is recrystallized from an ethanol-water mixture.

EXAMPLE 7

The following reaction is carried out:

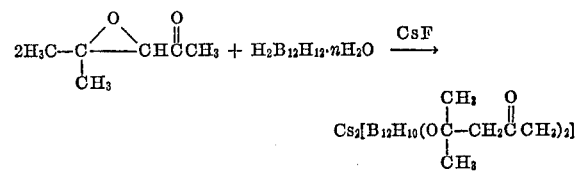

A solution of 22.4 g. (0.10 mole) of $Na_2B_{12}H_{12} \cdot 2H_2O$ in 40 ml. of water is passed through an "Amberlite IR 120–H" ion exchange column to produce the acid $H_2B_{12}H_{12} \cdot nH_2O$. Water is evaporated from the $H_2B_{12}H_{12} \cdot nH_2O$ in vacuum at 20° C. to give a solid residue. The acid residue is dissolved in 60 ml. of glyme and 22.8 g. (0.20 mole) of 3,4-epoxy-4-methyl-2-pentanone added dropwise. Glyme is evaporated in vacuum and the residue dissolved in 60 ml. of ethanol. A solution of 30.4 g. (0.20 mole) of cesium fluoride in 60 ml. of ethanol is added to precipitate

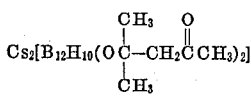

Product is recrystallized from an ethanol-water mixture.

EXAMPLE 8

This example illustrates the reaction of a polymeric epoxide with dodecahydrododecaborate acid hydrate.

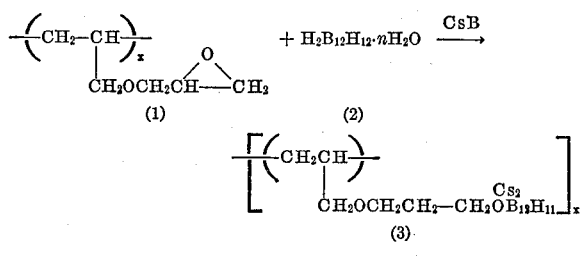

The procedure of Example 2 is followed to produce the product (3) shown. By increasing the quantity of (1) there is produced:

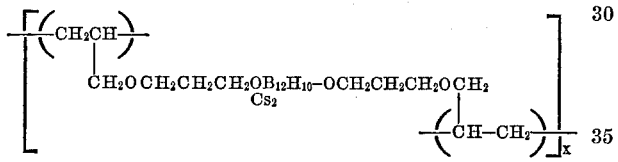

which was characterized by elemental and infrared analyses to have the structure shown.

Calc'd: B, 20.4. Found: B, 18.4.

EXAMPLE 9

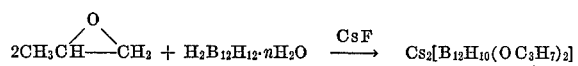

The reaction is conducted according to the procedure of Example 2 in glyme at a temperature of 30° C. and the product recovered as its cesium salt.

EXAMPLE 10

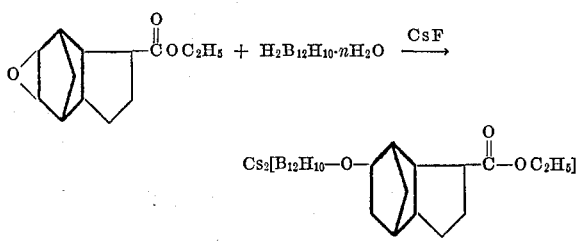

The procedure of Example 2 is followed at a temperature of 30° C. in glyme. The product is precipitated and recovered as its cesium salt.

EXAMPLE 11

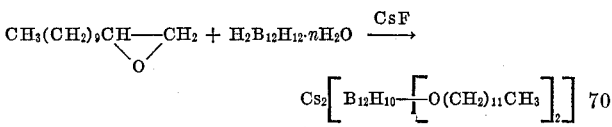

The reaction is carried out in glyme according to the procedure of Example 2 at a temperature of 55° C. and the product anion precipitated and recovered as its cesium salt.

EXAMPLE 12

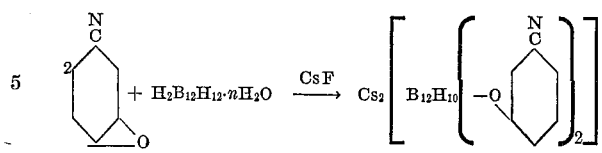

A solution of 22.4 g. (0.10 mole) of $Na_2B_{12}H_{12} \cdot nH_2O$ in 40 ml. of water is passed through an "Amberlite IR 120-H" ion exchange column to produce $H_2B_{12}H_{12} \cdot nH_2O$. Water is evaporated from the $H_2B_{12}H_{12} \cdot nH_2O$ in vacuum at a temperature of less than 20° C. to give a solid residue. The acid residue is dissolved in 60 ml. of glyme and 24.6 g. (0.20 mole) of 3,4-epoxycyclohexane carbonitrile added dropwise. Temperature is maintained at less than 30° C. Glyme is evaporated in vacuum and the residue dissolved in 60 ml. of ethanol. A solution of 30.4 g. (0.20 mole) of cesium fluoride in 60 ml. of ethanol is added to precipitate

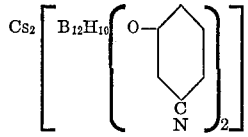

Product is recrystallized from an ethanol-water mixture.

EXAMPLE 13

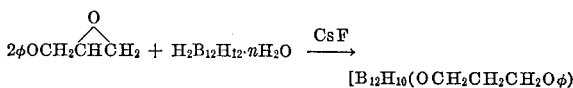

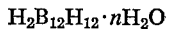

A solution of 22.4 g. (0.10 mole) of $Na_2B_{12}H_{12} \cdot 2H_2O$ in 40 ml. of water is passed through an "Amberlite IR 120-H" ion exchange column to produce the acid $$H_2B_{12}H_{12} \cdot nH_2O$$

Water is evaporated from the $H_2B_{12}H_{12} \cdot nH_2O$ in vacuum at a temperature of less than 20° C. to give a solid residue. The acid residue is dissolve in 60 ml. of glyme and 30.0 g. (0.20 mole) of 1,2-epoxy-3-phenoxypropane added dropwise. Temperature is maintained at less than 30° C. Glyme is evaporated in vacuum and the residue dissolved in 60 ml. of ethanol. A solution of 30.4 g. (0.20 mole) of cesium fluoride in 60 ml. of ethanol is added to precipitate $Cs_2[B_{12}H_{10}(OCH_2CH_2CH_2O\phi)_2]$. Product is recrystallized from ethanol-water mixture.

EXAMPLE 14

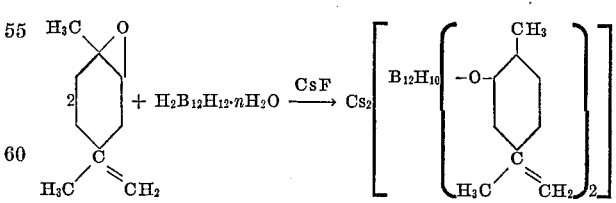

A solution of 22.4 g. (0.10 mole) of $Na_2B_{12}H_{12} \cdot 2H_2O$ in 40 ml. of water is passed through an "Amberlite IR 120-H" ion exchange column to produce the acid $$H_2B_{12}H_{12} \cdot nH_2O$$

Water is evaporated from the $H_2B_{12}H_{12} \cdot nH_2O$ in vacuum at a temperature of less than 20° C. to give a solid residue. The acid residue is dissolved in 60 ml. of glyme and 30.4 g. (0.20 mole) of dipentene monoxide added dropwise. Temperature is maintained at less than 0° C. Glyme is evaporated in vacuum and the residue dissolved in 60 ml. of ethanol. A solution of 30.4 g. (0.20 mole)

of cesium fluoride in 60 ml. of ethanol is added to precipitate.

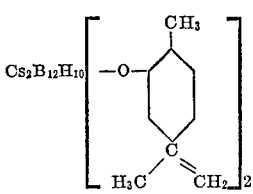

Product is not recrystallized.

EXAMPLE 15

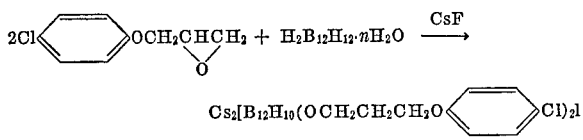

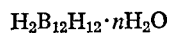

A solution of 22.4 g. (0.10 mole) of $Na_2B_{12}H_{12} \cdot 2H_2O$ in 40 ml. of water is passed through an "Amberlite IR 120–H" ion exchange column to produce the acid $$H_2B_{12}H_{12} \cdot nH_2O$$

Water is evaporated from the $H_2B_{12}H_{12} \cdot nH_2O$ in vacuum at 20° C. to give a solid residue. The acid residue is dissolved in 60 ml. of glyme and 36.8 g. (0.20 mole) of 1,2-epoxy-3-(4-chlorophenoxy)propane added dropwise. Glyme is evaporated in vacuum and the residue dissolved in 60 ml. of ethanol. A solution of 30.4 g. (0.2 mole) of cesium fluoride in 60 ml. of ethanol is added to precipitate

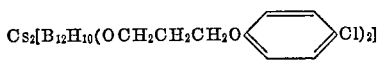

EXAMPLE 16

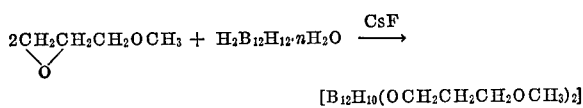

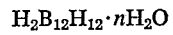

A solution of 22.4 g. (0.10 mole) of $Na_2B_{12}H_{12} \cdot 2H_2O$ in 40 ml. of water is passed through an "Amberlite IR 120–H" ion exchange column to produce the acid $H_2B_{12}H_{12} \cdot nH_2O$. Water is evaporated from the $$H_2B_{12}H_{12} \cdot nH_2O$$

in vacuum at 20° C. to give a solid residue. The acid residue is dissolved in 60 ml. of glyme and 17.6 g. (0.20 mole) of 1,2-epoxy-3-methoxy-propane added dropwise. Glyme is evaporated in vacuum and the residue dissolved in 60 ml. of ethanol. A solution of 30.4 g. (0.20 mole) of cesium fluoride in 60 ml. of ethanol is added to precipitate $Cs_2[B_{12}H_{10}(OCH_2CH_2CH_2OCH_3)_2]$.

EXAMPLE 17

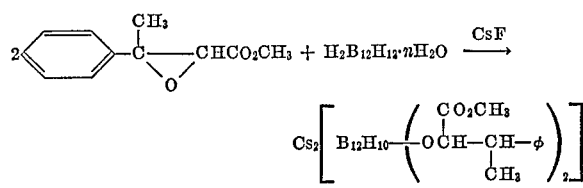

A solution of 22.4 g. (0.10 mole) of $Na_2B_{12}H_{12} \cdot 2H_2O$ in 40 ml. of water is passed through an "Amberlite IR 120–H" ion exchange column to produce the acid $H_2B_{12}H_{12} \cdot nH_2O$. Water is evaporated from the $H_2B_{12}H_{12} \cdot nH_2O$ in vacuum at 20° C. to give a white solid residue. The acid residue is dissolved in 60 ml. of glyme and 38.4 g. (0.20 mole) of phenylmethylglycidic ester added dropwise. Glyme is evaporated in vacuum and the residue dissolved in 60 ml. of ethanol. A solution of 30.4 g. (0.20 mole) of cesium fluoride in 60 ml. of ethanol is added to precipitate

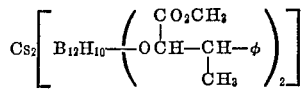

Product is recrystallized from an ethanol-water mixture.

I claim:
1. A process for preparing derivatives of icosahedral dodecahydrododecaborane which comprises contacting $H_2B_{12}H_{12} \cdot nH_2O$ with an epoxide having a structural formula

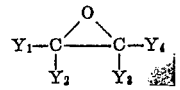

where each of $Y_1$, $Y_2$, $Y_3$ and $Y_4$ is hydrogen or a monovalent radical such that the epoxide is one which is capable of reacting with benzene in the presence of an aluminum chloride catalyst at a temperature of less than 100° C.

2. The process of claim 1 in which the reaction is carried out in an aqueous solution of $H_2B_{12}H_{12} \cdot nH_2O$.

3. The process of claim 2 wherein at least one of $Y_1$ and $Y_4$ is an organic radical with a functional group selected from the group of

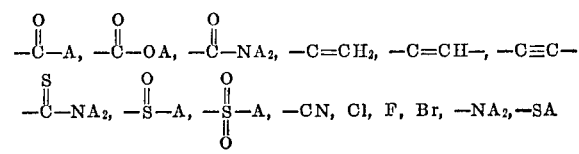

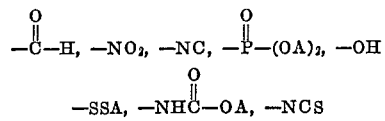

wherein A is a monovalent organic radical of up to about 15 carbon atoms.

4. The process of claim 2 wherein $Y_1$ is a monovalent polymeric radical having the structural formula,

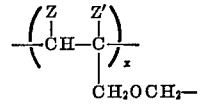

wherein Z and Z' are individually selected from the group consisting of hydrogen, cyano, carboxylic, hydroxyl, halogen, $C_1$ to $C_{14}$ alkyl, $C_2$ to $C_{14}$ alkenyl and $C_6$ to $C_{14}$ aryl; and x is a large whole number.

5. The process of claim 4 wherein $Y_1$ is a monovalent radical of a condensation polymer.

6. The process of claim 4 wherein $Y_1$ is a monovalent radical of an addition polymer.

7. The process of claim 1 wherein the epoxide is styrene oxide.

8. The process of claim 1 wherein the epoxide is ethylene oxide.

9. The process of claim 1 wherein the epoxide is 1,2-propylene oxide.

10. The process of claim 1 wherein the epoxide is dicyclopentadiene dioxide.

11. A linear synthetic organic addition polymer characterized by the recurring structural unit,

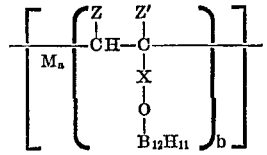

wherein Z and Z' are monovalent radicals individually selected from the group consisting of hydrogen, cyano, carboxylic, hydroxyl, halogen, and a hydrocarbon of up to 20 carbon atoms; M is a cation which forms a salt with the radical $[B_{12}H_{12-y}(OR)_y]^{-2}$; $a$ and $b$ are whole numbers of 1–3 inclusive whose values are dependent upon the valence of M such that $b=a/2$ (valence of M); and X is a divalent organic radical containing an ethylene group attached to the oxygen in the formula.

12. The polymer of claim 11 in which X is a hydrocarbon radical of up to 20 carbon atoms.

13. The polymer of claim 11 in which X is a polyalkylene ether radical of up to 20 carbon atoms.

14. A linear synthetic organic condensation polymer characterized by the recurring structural unit,

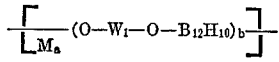

where $W_1$ is a divalent organic radical of up to 20 carbon atoms having ethylene groups attached to each oxygen in the formula, each of said groups being capable of existence as a substituent attached to a carbon atom adjacent to an epoxy group in a 1,2-epoxide compound; M is a cation which forms a salt with the radical $$[B_{12}H_{12-y}(OR)_y]^{-2}$$

and $a$ and $b$ are whole numbers of 1–3 inclusive whose values are dependent upon the valence of M such that $b=a/2$ (valence of M).

References Cited

UNITED STATES PATENTS

| | | |
|---|---|---|
| 3,040,010 | 6/1962 | Shokal et al. |
| 3,093,660 | 6/1963 | Aftandilian et al. |

HAROLD D. ANDERSON, *Acting Primary Examiner.*

T. PERTILLA, *Assistant Examiner.*

U.S. Cl. X.R.

106—288; 252—135; 260—2, 75, 77.5, 78